May 15, 1934.　　　　　H. EISELE　　　　　1,958,988
VALVE
Filed July 24, 1930　　　2 Sheets-Sheet 2
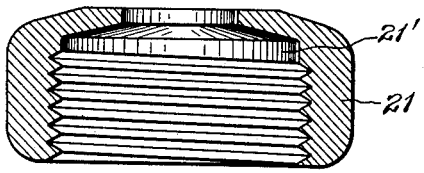
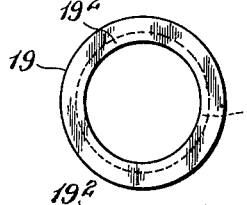
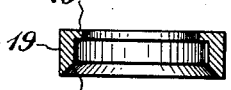
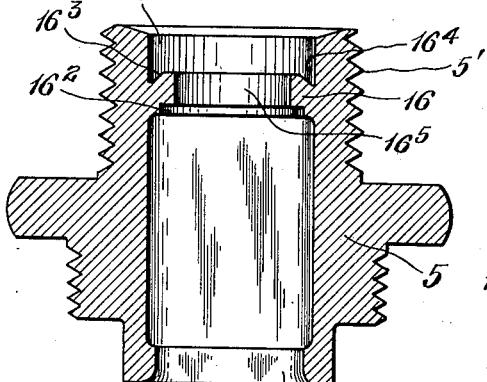
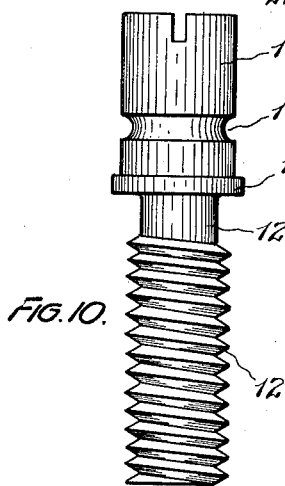
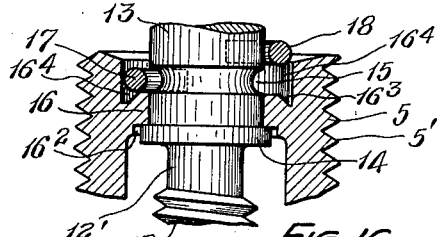
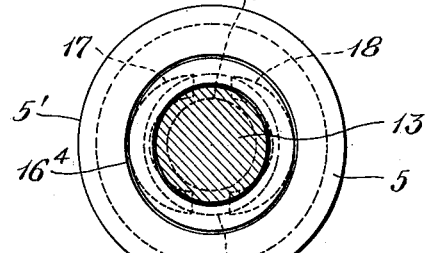
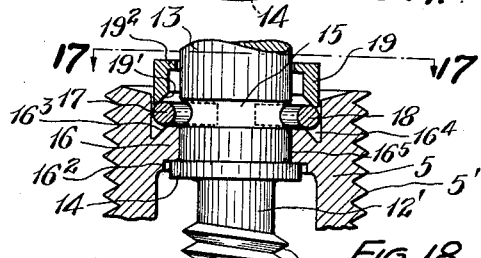
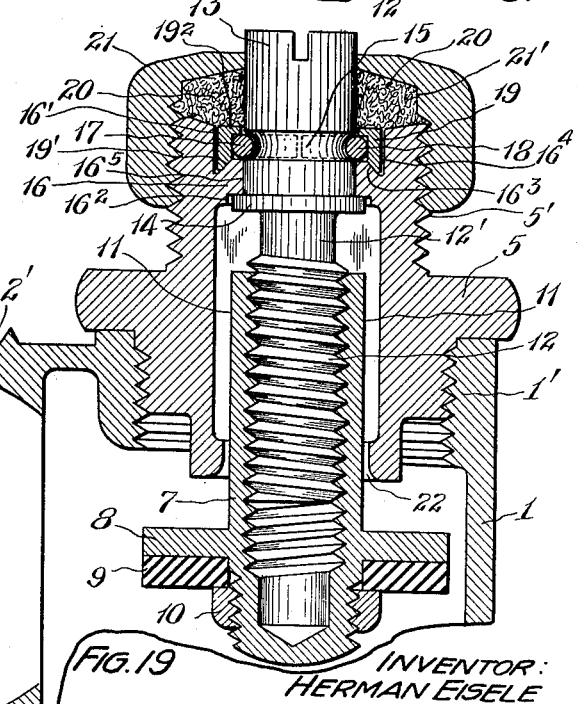
INVENTOR:
HERMAN EISELE
BY George W. Saywell
ATTORNEY.

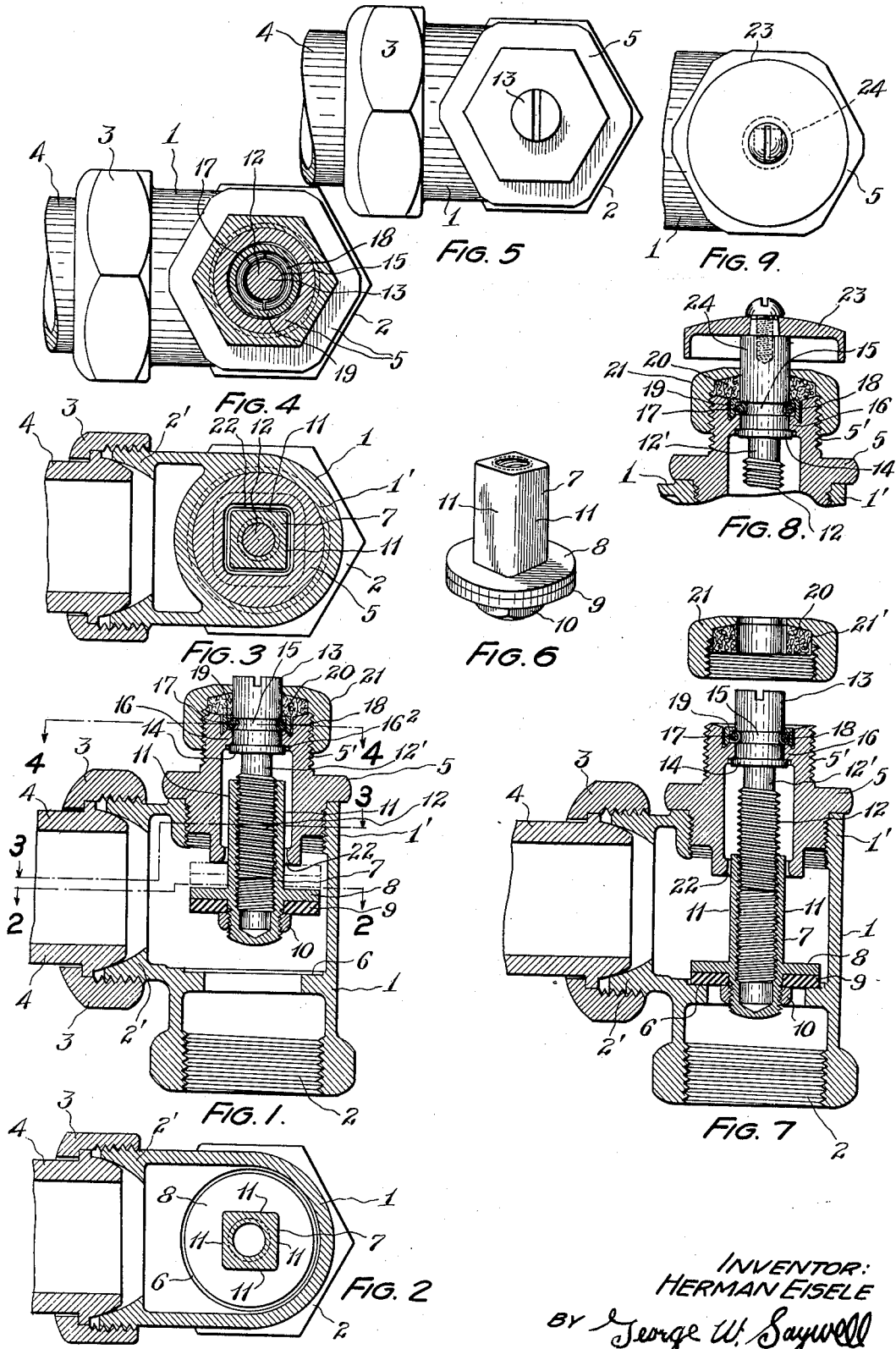

Patented May 15, 1934

1,958,988

UNITED STATES PATENT OFFICE 1,958,988

VALVE

Herman Eisele, Cleveland, Ohio, assignor to The Wellman Bronze and Aluminum Company, Cleveland, Ohio, a corporation of Ohio Application July 24, 1930, Serial No. 470,289

10 Claims. (Cl. 251—48)

The invention particularly relates to stop valves, and finds its largest field of usefulness in water lines leading to the ordinary flush valves of plumbing and sanitary systems. The objects of the invention are to provide means of this character which may be readily and conveniently assembled; may be easily and quickly opened for inspection and adjustment or repairs; may be easily inserted in or removed from the valve casing as a unit assembly; which assures an accurate and tight seating of the valve face upon the valve seat; which provides an improved means in the valve casing cap for preventing the rotation of the valve element, with relation to the casing; provides means for incorporating within the valve casing cap, the entire mechanism for locking the usual valve screw to the co-operating valve casing; and particularly, which provides means within the valve casing cap, for preventing the stem of the valve screw from being forced downwardly.

The annexed drawings and the following description set forth in detail certain means exemplifying my invention, such means constituting, however, but one of the various forms in which the principle of the invention may be embodied.

In said annexed drawings:

Figure 1 is a central vertical section of my improved valve assembled in a suitable casing and shown in full lines in partly open position, a full open position of certain of the valve parts being shown in dot-and-dash lines;

Figure 2 is a plan section, taken in the planes indicated by the line 2—2, Figure 1;

Figure 3 is a plan section, taken in the planes indicated by the line 3—3, Figure 1;

Figure 4 is a plan section, taken in the plane indicated by the line 4—4, Figure 1;

Figure 5 is a top plan view of the valve;

Figure 6 is a detached perspective of the valve element proper;

Figure 7 is a vertical section, similar to Figure 1, but showing the valve closed and the packing nut for the valve stem and cap removed, this view illustrating the operation necessary for inspection and repair of the thrust-resisting elements, and for the re-packing of the packing nut;

Figure 8 is a fragmentary view of the upper portion of a slight modification which shows a hand wheel type of operating element;

Figure 9 is a plan view of the modification shown in Figure 8;

Figures 10 to 19 inclusive are views upon an enlarged scale, of which

Figure 10 is an elevation of the valve screw detached;

Figure 11 is a vertical section of the casing cap detached;

Figure 12 is a plan view of two semi-circular rings utilized for resisting downward thrust upon the stem of the valve screw;

Figures 13 and 14 are a vertical section, and a plan view, respectively, of a locking collar used to hold the thrust-resisting rings in place;

Figure 15 is a vertical section of the casing cap packing nut before the packing has been inserted therein;

Figure 16 is a vertical section of a fragmentary portion of the casing cap, showing the valve screw stem in elevation and the thrust-resisting rings in partly assembled position;

Figure 17 is a plan section, taken from the plane indicated by the line 17—17, Figure 18;

Figure 18 is a view similar to Figure 16, but showing the assembling operation at a later stage; and Figure 19 is a view similar to Figure 7 but showing the entirely assembled condition of the various elements illustrated in Figure 6 and Figures 10 to 15, inclusive.

Referring to the annexed drawings in which the same parts are indicated by the same respective numbers in the different views, a valve casing 1 is formed with an internally-threaded inlet portion 2 and with an externally-threaded discharge portion 2' whereby it can be connected to an outlet pipe 4 by any suitable coupling member 3. The casing 1 is formed with an internally screw-threaded boss 1' adapted to receive an externally-threaded cap 5. Opposite the boss 1' the casing 1 is formed with a valve seat 6 adapted to accommodate the seating face of a valve 7 which is formed with a flange 8 to which is secured a seating ring 9 by means of a nut 10. The body or stem portion of the valve 7 is hollow and is rectangular in cross-section and thus provided with the plane peripheral surface portions 11. This valve 7 is vertically reciprocable to and from its seat 6 and for the purpose of effecting these opening and closing movements of the valve, I provide an externally-threaded valve screw 12 adapted to co-operate with an internal thread formed in the hollow body or stem portion of the valve 7, the screw 12 being formed with a stem 12' having a slotted-end head member 13. As the valve 7 is moved up and down, it is guided within a rectangular opening 22 formed in the bottom of the valve cap 5 and communicating with the chamber within the casing 1, as plainly shown in Figure 1.

Means are provided for retaining the valve screw or operating stem 12 against up and down movement and for packing the joint between and around the head 13 and the top of the cap 5. These means comprise the following elements: A shoulder portion 14 is formed on the stem 12' and is adapted to be seated in an annular recess 16² formed in an annular internal flange member 16 of the cap 5. This restrains the valve screw 12 against upward or outward movement. For preventing the downward or inward movement of the valve screw 12, I provide a pair of semi-circular thrust-resisting ring segments 17 and 18 adapted to be seated in a peripheral groove or recess 15 formed in the screw head 13 and rigidly retained therein by an annular locking collar 19 having an inwardly-extending flange 19² bearing upon that top part of the ring segments 17 and 18 which extend outwardly from the groove 15 beyond the surface of the head 13, and formed with an upwardly and inwardly bevelled surface 19' adapted to co-operate with and engage a downwardly and outwardly bevelled surface 16³ of the flange 16, which surface 16³ forms one wall of an annular recess 16 formed in the cap 5 adjacently above the flange 16, as plainly shown in Figure 11. For packing the joint between the cap 5 and the thrust-resisting elements and the screw head 13, I provide a packing nut 21 adapted to engage the externally-threaded portion 5' of the cap 5 and formed with a recess 21' adapted to accommodate the packing 20 immediately above the top of the cap 5 and the locking collar 19, as plainly shown in Figures 1 and 19.

The assembling of the valve, valve stem, and co-operating parts in the casing cap 5 is accomplished as follows: The valve 7 is engaged with the screw 12 and these two connected elements are then passed upwardly thru the rectangular opening 22 and the screw 12 is passed thru the opening 16⁵ until the shoulder 14 engages in the recess 16². Then one of the semi-circular thrust-resisting ring segments 17 and 18 is dropped through the chamber 16' into the recess 16⁴, and the other ring segment also dropped into the remaining portion of said recess 16⁴, as shown in Figure 16. Then, as shown in Figure 18, the locking collar 19 is inserted, the bevelled lower edge 19' of which forces the segments 17 and 18 inwardly into the groove 15. Then the packing nut 21 is secured to the top of the cap 5, which action forces the packing and thrust ring segments and locking collar securely into position, after which the entire assembly can be inserted as a unit in the valve casing 1 by screwing the cap 5 into the boss 1'.

For the purpose of inspecting the packing nut 21 and thrust resisting ring segments 17 and 18 and locking collar 19, and for repair or replacement of the same, the packing nut 21 can be removed from the cap 5, as shown in Figure 7. In addition to the fact that the ring segments 17 and 18 and the collar 19 provide thrust-resisting means and prevent the screw 12 from being forced downwardly when any thrust is made upon the stem head 13, such as when adjusting the valve through the medium of a screw-driver engaging the head 13, I direct particular attention to the fact that these several means are all contained within the cap 5.

My improvements are applicable without change either to an angle casing or a straight casing. I have illustrated in the accompanying drawings the application thereof to an angle casing, but it is evident that the entire assembly as shown could be inserted in a straight casing.

The modified form of valve shown in Figures 8 and 9 illustrates the use of a hand wheel 23 for rotating the stem of the screw 12 instead of the slot in the external extension 13 in the form heretofore described. In the hand wheel type of mounting, the stem 24 is made somewhat longer and is formed with a square portion at the upper end upon which is seated the hand wheel 23 which is formed with a square opening and which is secured by a screw. This hand wheel type is substituted for the screw driver type in those installations in which this more convenient manner of operating the screw 12 is permissible.

What I claim is:

1. A valve assembly comprising a casing; a valve in the casing; a cap adapted to be removably engaged with the casing; an operating stem projecting from the cap and adapted to engage the valve for reciprocating the latter; packing for said stem; means engageable with the stem and cap but separable therefrom for preventing longitudinal movement of the stem inwardly, said means being held in operative engagement with the stem and cap by said packing; and means within the cap for preventing the rotation of the valve.

2. A valve assembly comprising a casing; a valve in the casing; a cap adapted to be removably engaged with the casing; an operating stem projecting from the cap and adapted to engage the valve for reciprocating the latter; a shoulder member formed integrally with and within said cap; shoulder means formed upon said stem adapted to abut one face of said shoulder member to prevent movement of the stem in one direction; a recess formed in the stem; a removable abutment element adapted to seat in said recess and to engage the other face of said shoulder member, whereby longitudinal movement of the stem is prevented in the other direction; means for retaining said abutment element in operative position; and means for preventing the rotation of the valve.

3. A valve assembly comprising a casing; a cap adapted to be removably engaged therewith, the cap being formed with a guide surface; an operating stem engageable for turning from without the casing; a valve within the casing adapted to be engaged by the stem for reciprocating movement of the valve, the guide surface of the cap preventing the rotation of the valve; packing for the stem; a recess formed on the stem; a shoulder formed in the cap; and removable means located inwardly of said packing and engaging in said recess and engaging said shoulder for preventing the inward movement of the stem.

4. A valve assembly comprising a casing; a valve in the casing; a cap adapted to be removably engaged with the casing; an operating stem projecting from the cap and adapted to engage the valve for reciprocating the latter, the operating stem and the cap being formed with abutting shoulders to prevent outward movement of the stem, the latter being additionally formed with a recess and the cap being provided with additional shoulder means; means mounted in said recess and adapted to engage said additional shoulder means to prevent the inward movement of the stem, said engaging means being adapted for removal from said stem in a radial direction and located entirely within said cap; and means for preventing the rotation of the valve.

5. A valve assembly comprising a casing; a valve in the casing; a cap adapted to be removably engaged with the casing; an operating stem projecting from the cap and adapted to engage the valve for reciprocating the latter, the operating stem and the cap being formed with abutting flanges to prevent outward movement of the stem; thrust-resisting ring segments surrounding and engaging the operating stem and engaging said cap to prevent inward movement of the stem means for retaining the ring segments in operative position; and means within the cap for preventing the rotation of the valve.

6. A valve assembly comprising a casing; a cap adapted to be removably engaged therewith; a valve in the casing having a stem portion; means for preventing the rotation of the valve; an operating stem in the cap, extended therethrough for engagement from without, and adapted to engage the valve stem for reciprocating movement of the valve, the operating stem being formed with an external flange, the cap being formed with an internal flange against which the stem flange abuts to prevent outward movement of the operating stem, the operating stem being formed with an external groove adjacently above the plane of the top surface of the cap flange; a plurality of split ring segments in said groove; a clamping collar exteriorly engaging the ring segments; and means for actuating the clamping collar.

7. A valve assembly comprising a casing; a cap adapted to be removably engaged therewith; a valve in the casing having a stem portion; means for preventing the rotation of the valve; an operating stem in the cap, extended therethrough for engagement from without, and adapted to engage the valve stem for reciprocating movement of the valve, the operating stem being formed with an external flange, the cap being formed with an internal flange against which the stem flange abuts to prevent outward movement of the operating stem; a packing nut engaging the cap around the extended end of the operating stem, the latter being formed with an external groove adjacently above the plane of the top surface of the said cap flange; a plurality of split ring segments in said groove; a clamping collar exteriorly engaging the ring segments and having a bevelled surface slidably engaging a complementary surface of the cap flange; and packing in the nut above the clamping collar and the top of the cap, and around the extended end of the operating stem.

8. A valve assembly comprising a casing; a cap adapted to be removably engaged therewith, the cap being formed with an opening communicating with the interior of the casing and having plane walls forming guide surfaces; a valve in the casing having a stem rectangular in cross-section and extended through said opening into the cap and closely registering with the walls of the opening to prevent the rotation of the valve stem; an operating stem in the cap, extended therethrough for engagement from without, and adapted to engage the valve stem for reciprocating movement of the valve, the operating stem being formed with an external flange, the cap being formed with an internal flange against which the stem flange abuts to prevent outward movement of the operating stem; a packing nut engaging the cap around the extended end of the operating stem, the latter being formed with an external groove adjacently above the plane of the top surface of the said cap flange; a plurality of split ring segments in said groove; a clamping collar exteriorly engaging the ring segments and having a bevelled surface slidably engaging a complementary surface of the cap flange; and packing in the nut above the clamping collar and the top of the cap, and around the extended end of the operating stem.

9. A valve assembly comprising a casing; a cap adapted to be removably engaged therewith; a valve in the casing having a stem portion; an operating stem in the cap, extended therethrough for engagement from without, and adapted to engage the valve stem to actuate the valve, the operating stem being formed with an external flange, the cap being formed with an internal flange against which the stem flange abuts to prevent outward movement of the operating stem, the operating stem being formed with an external groove above the plane of the top surface of the cap flange; a plurality of split ring segments in said groove; and means for holding the segments in the groove.

10. A valve assembly comprising a casing; a valve in the casing; a cap adapted to be removably engaged with the casing; an operating stem projecting from the cap and adapted to engage the valve for reciprocating the latter; packing for said stem; means removably attached to the stem and adapted, when in operative engagement with the casing, to prevent axial movement of the stem inwardly and outwardly, locking means for said first-mentioned means, said locking means being held in operative engagement by said packing; and means within the cap for preventing the rotation of the valve.

HERMAN EISELE.